Figure 1:
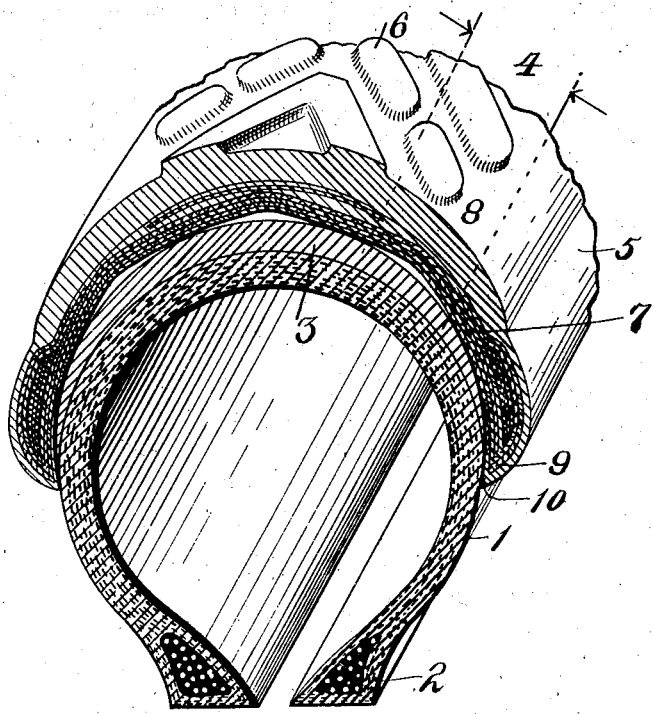

W. T. DORGAN.
TIRE PROTECTOR.
APPLICATION FILED NOV. 18, 1911.

1,027,108.

Patented May 21, 1912.

Witnesses:
Austin B. Hanscom
A. L. McClintock

INVENTOR—
William T. Dorgan,
By C. E. Humphrey.
ATTORNEY.

UNITED STATES PATENT OFFICE.

WILLIAM T. DORGAN, OF AKRON, OHIO, ASSIGNOR TO THE STANDARD TIRE PROTECTOR COMPANY, OF AKRON, OHIO, A CORPORATION OF OHIO.

TIRE-PROTECTOR.

1,027,108.  Specification of Letters Patent.  Patented May 21, 1912.

Application filed November 18, 1911. Serial No. 661,184.

*To all whom it may concern:*

Be it known that I, WILLIAM T. DORGAN, a citizen of the United States, residing at Akron, in the county of Summit and State of Ohio, have invented new and useful Improvements in Tire-Protectors, of which the following is a specification.

This invention relates to tire-protectors of the type shown in United States Letters-Patent granted to me Nov. 19, 1907, No. 871,575, and July 26, 1910, No. 965,695.

The object of this invention is to construct a tire-protector of the type described having an annularly-formed body portion of tough but yieldable material provided with lateral beads which will hug the tire or tire-protector in connection with which it is used and be thus self-maintaining irrespective of the inflation or deflation of the tire. And further, a primary object of the invention is to impart to the inner face of the wall of the protector a somewhat angular conformation which is produced by forming the same on a suitable core or mandrel having the before-mentioned shape, so that when the tire-protector is mounted in a tire or tire-shoe, which is ordinarily approximately cylindrical when inflated, the various inner facets of the protector which engage the respective portions of the tire or tire-shoe will contact therewith tangentially so that the portions of the tire-protector at the angles between the various facets thereof will lie opposite to but out of contact with the portions or zones of the tire or tire-protector which are subjected to the greatest flexion and vibration, and in so doing the wear on these portions of the tire or tire-shoe is thereby materially reduced. In other words, the inner face of the tire-protector will have an approximately polygonal contour in cross-section so that when disposed on a cylindrical or approximately cylindrical tire the sides of the polygonal figure will be tangential to the cylindrical outline of the tire and the angular portions at the junction of the sides of the polygonal figure will be out of contact therewith.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Figure 2:
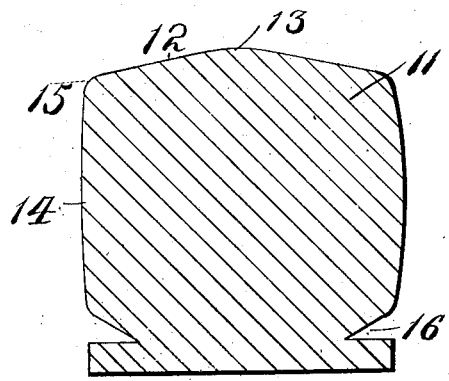

In the drawings in which similar reference numerals indicate like parts in the different figures, Figure 1, is a perspective view of a section of a pneumatic tire-shoe showing a section of my improved protector mounted thereon and in operative relation therewith, said protector being constructed in accordance with this invention; and, Fig. 2, is a transverse sectional view of a core or mandrel used in building up the tire-protector a section of which is shown in Fig. 1.

Referring to the drawings in detail the reference numeral 1 denotes an ordinary tire-shoe provided with the usual beads 2 and tread portion 3. Experience has clearly demonstrated that the portions 4 of the tire-shoe on each side of the tread are subject to the greatest amount of flexion and are most severely vibrated when in use.

Mounted on the tire-shoe 1 is an annular tire-protector 5 constructed to all intents and purposes in approximately the same manner as has been described in the before-mentioned Letters-Patent and embodying a wear-resisting anti-skid outer face 6 and a plurality of layers of rubber impregnated fabric 7 on which is mounted the tread 8. This protector is also provided with gripping-beads 9 for hugging the lateral walls of the tire or tire-shoe firmly so as to maintain itself against displacement when in use. Ordinarily the inner wall of the tire-protector 5 is provided with a lining of rubber-saturated fabric 10 which is adapted to receive the wear and to contact with the outer surface of the tread portion of the tire-shoe 1. In practice, I build up the tire-shoe on a core or mandrel 11 having approximately the configuration shown in Fig. 2 with the outer portion thereof formed as surfaces of conic frusta 12 united to form along the central line of the tire an obtuse angle 13 and provided with slightly convex lateral faces 14 uniting with surfaces 12 to form obtuse angles 15. Near the inner portions of the lateral faces 14 of the mandrel are circumferential V-shaped grooves 16 in which the beads 9 are formed so as to impart to them a tendency, when the protector is in use to spring or move laterally toward each other to grip the side faces of the tire or tire-shoe in connection with which the protector is to be used.

When the tire-protector is mounted on a tire or tire-shoe, as shown in Fig. 1, it will be apparent that the angular portions of the protector will lie opposite to, but away from, the zones, one of which is designated by the reference numeral 4, and will not contact therewith intimately during the vibration or distortion of the tire-shoe in use, thereby reducing to a minimum the wear on the tire or tire-shoe when this peculiarly-shaped protector is used.

It may be pointed out that a tire-protector shoe, having a cross sectional configuration such as is shown in Fig. 1, no matter how long it is used, will still retain the angular configuration, which is imparted to it during its manufacture and inherently retains this shape at all times.

I claim:

1. A tire-protector adapted to be mounted on a tire or tire-shoe and comprising an annularly-formed sheath having a general semi-circular form in cross-section with the inner face thereof polygonally-fashioned, the lateral edges of said sheath being provided with beads adapted to grip the lateral faces of said tire or tire-shoe to thereby retain said protector in position, the polygonally-formed inner faces of said protector engaging said tire or tire-shoe tangentially whereby the angular portions of the inner face of the protector will lie opposite to but out of contact with certain portions of the tire or tire-shoe which are subjected to the greatest flexion or vibration.

2. A tire-protector adapted to be mounted on a tire or tire-shoe and comprising an annularly-formed sheath of material yieldable in unison with the tire or tire-shoe on which it is mounted, said tire-protector having a general semi-circular form in cross-section, the lateral edges thereof provided with beads adapted to grip the lateral faces of the tire or tire-shoe and to thereby retain the tire-protector in position, the inner face of said protector fashioned to form surfaces of conic frusta united by obtuse-angles to thereby form an approximately polygonal figure, the sides of which are adapted to engage the outer face of said tire or tire-shoe tangentially whereby the angular portions at the junction of the surfaces of the inner face of the protector will lie opposite to but out of contact with those portions of the tire or tire-shoe which are subjected to the greatest flexion or vibration.

In testimony whereof I have hereunto set my hand in presence of two subscribing witnesses:

WILLIAM T. DORGAN.

Witnesses:
W. G. HARRIS,
R. M. LINNEUX.